Feb. 8, 1955     H. G. FOSTER     2,701,402
SLIDING SNAP HOOK
Filed Dec. 23, 1949     2 Sheets-Sheet 1
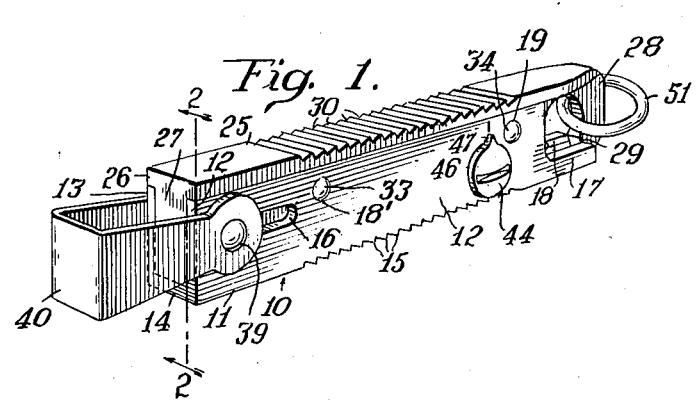
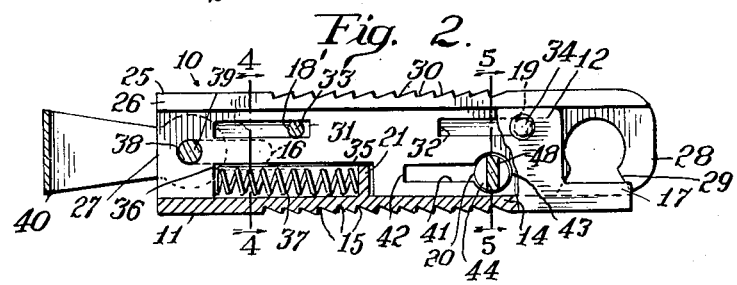
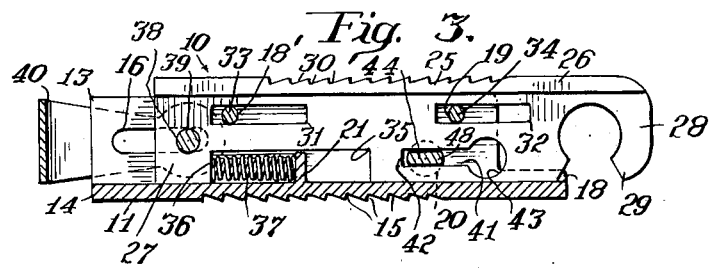
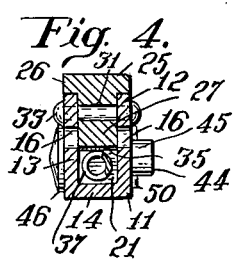 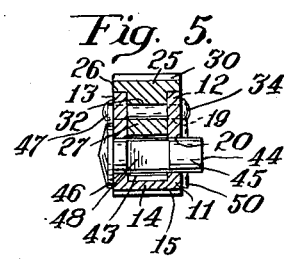 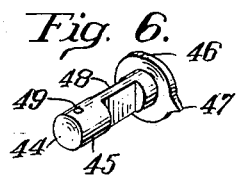
INVENTOR
Harry G. Foster
BY *Cyrus Kehr & [signature]*
ATTORNEY

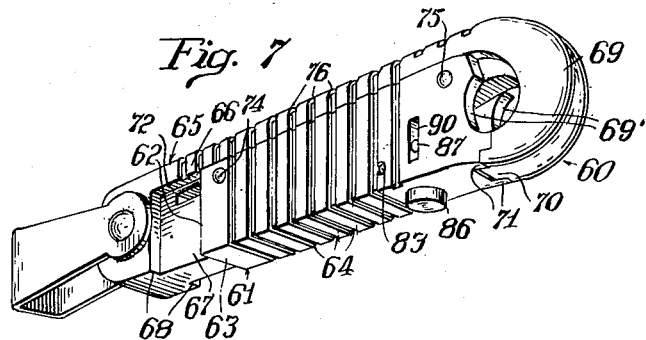
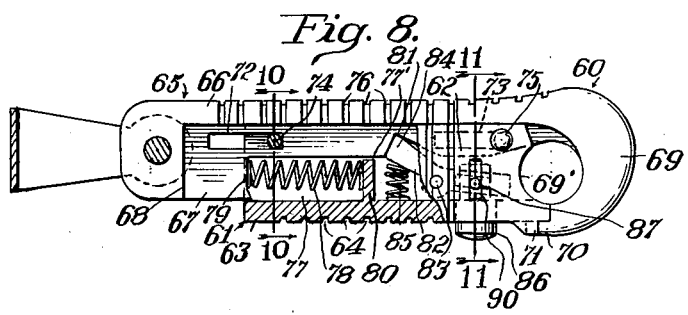
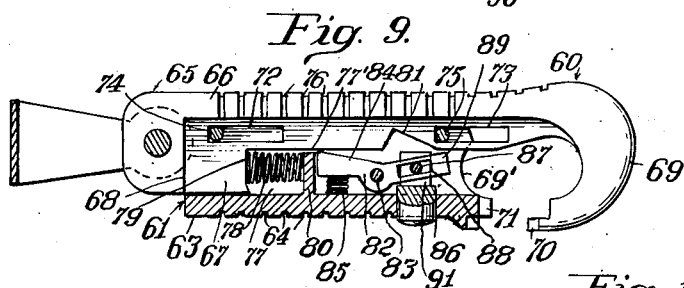
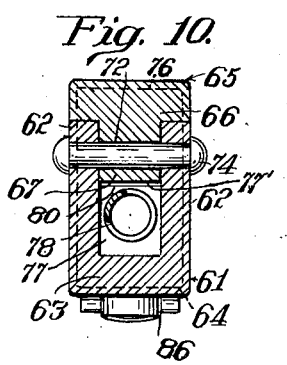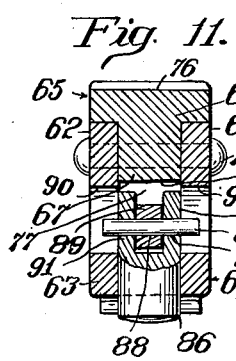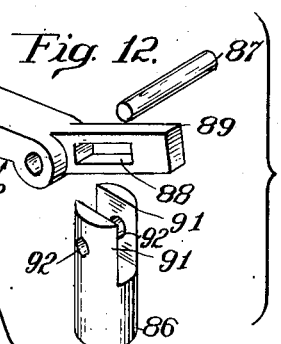
INVENTOR
Harry G. Foster

United States Patent Office 2,701,402
Patented Feb. 8, 1955

2,701,402
SLIDING SNAP HOOK
Harry G. Foster, Mullens, W. Va.

Application December 23, 1949, Serial No. 134,748

7 Claims. (Cl. 24—239)

This invention relates to an improved sliding snap hook, and is particularly directed to snap hooks that may be used for hitching an animal such as a dog or the like by its harness to a leash or a chain.

One object of this invention is to provide a sliding snap hook so constructed that it can be operated into an open position for receiving a ring or the like simply by the application of pressure to the sliding members in opposite directions.

A further object of this invention is to provide a sliding snap hook that is provided with a simple but effective means for locking the parts together to prevent accidental or unwanted sliding of the parts on opening of the hook, and thereby permitting the animal to free itself from its restraint.

A further object of this invention is to provide a sliding snap hook provided with a locking mechanism that is positive in action and cannot be unlocked accidentally, as by jarring or jerking the snap.

A still further object of this invention is to provide a sliding snap hook that is economical to manufacture and has a minimum number of parts therein, which parts are so arranged that ordinary wear thereon will not materially affect the satisfactory operation of said hook.

Other objects and advantages of this invention will become apparent as the discussion proceeds and when considered in connection with the accompanying claims and drawings, in which:

Fig. 1 is a perspective view of a sliding snap hook embodying my invention;

Fig. 2 is a longitudinal section taken along the line 2—2 in Fig. 1, showing the hook in elevation in its normally closed position;

Fig. 3 is a view similar to Fig. 2, showing my hook in its open position;

Fig. 4 is a cross section on the line 4—4 in Fig. 2;

Fig. 5 is a cross section on the line 5—5 in Fig. 2;

Fig. 6 is a perspective view of the locking pin;

Fig. 7 is a perspective view of a modified form of a snap hook embodying my invention;

Fig. 8 is a longitudinal section therethrough, with the hook in closed position;

Fig. 9 is a view similar to Fig. 8, showing the hook in its open position;

Fig. 10 is a cross section taken along the line 10—10 in Fig. 8;

Fig. 11 is a cross section taken along the line 11—11 in Fig. 8; and

Fig. 12 is an exploded perspective view of the locking mechanism of my modified hook.

Turning now to a detailed description of the drawings, the numeral 10 designates generally my assembled sliding snap hook, which, it is here pointed out, may be of any material desired, such as plastic, metal, or the like. The hook 10 comprises, principally, an elongated body member 11 generally of U-shape in cross section having a pair of upstanding side walls 12 and 13, respectively, extending substantially along its length, and a base portion 14 lying intermediate of and interconnecting the side members 12 and 13 throughout the length of the member 11.

Serrations, notches, or the like, 15 are provided on the outer surface of the base portion 14, as shown in Figs. 1, 2 and 3. At one end, the sides 12 and 13 have a pair of complementary elongated recesses 16 therein. At the opposite end, the sides 12 and 13 of the member 11 are notched out leaving fingers 17 and 18 thereon, as shown in Figs. 1 and 2. The base 14 extends the length of the fingers 17 and 18.

Each of the side walls 12 and 13 is provided with aligned holes or openings 18', 19 and 20, as shown in Figs. 1, 2 and 3.

Intermediate the ends of the upstanding walls 12 and 13 and the base member 14 is a partial bridge 21, as shown in Figs. 2 and 3. The bridge 21 may be formed either integral with the walls 12 and 13 and base 14 or may be affixed thereto, as by welding or the like, after the completed member 11 is formed.

A second member 25 provided with a T-head 26 and a body portion 27 is slidably interfitted into the member 11. One end of the member 25 is provided with a C-hook 28 opening downwardly in the position illustrated, so as to cooperate with the end of the base portion 14 and the extension fingers 17 and 18. The members 11 and 25 are so arranged that when the hook is in its normally closed position, the end 29 of the hook 28 will slidably interfit a short distance into the space between the fingers 17 and 18 and will overlie the end of the base portion 14 to close the opening in the hook.

The sides of the head 26 of the T-member 25, as best shown in Figs. 1, 4 and 5, extend outwardly just over or to the outside surfaces of the upstanding walls 12 and 13. The top surface of the T-head 26 is provided with serrations, notches, or the like, 30 in a manner similar to the notches 15, as shown. Elongated slots 31 and 32 are provided near the T-head 26 in the body portion 27 of the member 25 and are spaced apart from each other and also spaced inwardly from the respective ends of the member. A pin 33, such as a rivet, bolt, or the like, is inserted through the aligned holes 18 and through the slot 31. The holes 18 are positioned so that the pin 33 permits a limited sliding motion of the member 25 within the member 11 and relative thereto. Similarly, the slot 32 receives therethrough a pin 34 locked in the aligned holes 19, as shown in Figs. 2 and 3, and likewise permits limited sliding motion of the member 25 within the member 11 in the same manner as does the slot 31. The pins 33 and 34 also maintain the members 11 and 25 together.

Located in the bottom or side of the body portion 27 opposite the T-head 26 is an elongated recess 35, which is adapted to slidably receive the bridge member 21. Inserted between the inner face of the bridge member 21 and the inner face 36 of the recess 35 is a spring member 37 which tends to urge the sliding members 11 and 25 into a normally closed position, as shown in Fig. 1. A further hole 38 is provided in the base portion 27 opposite the C hook 28, and a pin 39 passes through this hole 38 and the aligned slots 16 and holds a U-hook 40 pivotally onto the member 25 of the snap. It will be seen from a study of the drawings that the slots 16 permit the sliding members 11 and 25 to move longitudinally with respect to each other and will permit the pin 39 to carry the member 40 along with the body portion 27 when the snap is actuated.

A key hole slot 41 is provided in the body portion 27. This slot has one end portion 42 thereof narrow in width, and the opposite end portion 43 is enlarged and preferably round.

A locking pin 44, shown in detail in Fig. 6, consists of a round body member 45 having a head 46 with an indicating member 47 thereon. Intermediate the ends of the member 45 is an elongated flattened bridge 48, as best shown in Figs. 2, 3 and 6. A hole 49 is provided in one end of the body member 45 and is adapted to receive a pin or other suitable locking means 50, as best shown in Figs. 4 and 5. The locking pin 44 is slidably and rotatably inserted through the aligned holes 20 of the side members 12 and 13, and also through the enlarged opening 43 of the recess 41. After the locking pin 44 is inserted, the pin 50 is inserted into the hole 49 and this rotatably locks the member 44 in the snap. It is here pointed out that the thickness of the bridge 48 should be less than the width of the elongated portion 42 of the recess 41, so as to permit free sliding motion of the locking pin 44 in the portion 42 when the bridge 48 is turned parallel thereto, as shown in Fig. 3, but should block sliding of the bridge 48 therein when the pin 44 is turned at right angles thereto, as indicated in Fig. 2.

The operation of my snap is as follows:

The lock member 44 is turned to the position shown in Fig. 3 so that the bridge 48 is parallel to the recess 42, and pressure, as between the thumb and forefinger, in opposite directions is applied to the respective serrations 15 and 30. This will cause relative sliding movement of the members 11 and 25 and will let the C hook 28 move to the open position shown in Fig. 3. A ring or the like 51 is then dropped into the C member 28 and the pressure on the serrations 15 and 30 is released. The spring 37 bearing against the bridge 19 and the end 36 of the recess 35 will cause the members 11 and 25 to snap back into closed position, shown in Fig. 1. The head 46 of the locking pin 44 is then turned so that the bidge 48 is at right angles to the slot 42, or into the position shown in Fig. 2. Thereby the snap is thus locked from any further sliding motion until the member 46 is again turned so that the bridge 48 is parallel to the slot 42, as shown in Fig. 3. The indicator 47 may register with indicia on the body member 11 to show the position of the bridge 48 relative to the elongated portion 42 of the slot 41.

Turning now to a detailed description of the modified form embodying my invention, as shown in Figs. 7 to 12 inclusive, the numeral 60 designates the modified snap generally. As in the principal form embodying my invention, the snap 60 comprises an elongated body member 61 U-shaped in cross section, having a pair of upstanding side walls 62 extending substantially along its length and a base portion 63 lying intermediate of and interconnecting the side walls 62, which extends throughout the length of the member 61. Transverse serrations, notches or the like, 64, are provided on the outer surface of the base portion 63 and sides 62, as shown in Figs. 7, 8 and 9.

Slidably interfitted into the U-shaped body member 61 is a T-head 65 having an upper portion 66 and a depending portion 67. The depending portion 67 extends substantially the length of and at a right angle to the portion 66 and slidably interfits between the sides 62 of the member 61. At one end of the T-head 65 there is provided a pair of shoulders 68, as shown in Fig. 7. On the opposite end of the T-head 65 is a C-hook 69 which cooperates with a notch 69' formed in the end of body member 61 to form a closure. The end of C-hook 69 is provided with a reduced projection 70 which is adapted to interfit with a complementary notch 71 provided in the base portion 63 adjacent the notch 69'.

Adjacent opposite ends of the depending portion 67 and formed therein are elongated slots 72 and 73 which receive pins 74 and 75 therethrough and which pins extend also through the upstanding walls 62 of the U-shaped member 61. The pins 74 and 75 hold the members 61 and 65 together in sliding relation and limit the extent of the sliding movement therebetween.

Serrations 76 or the like are formed about the top portion of the member 65 and coact with the serrations 64 in the same manner as the serrations 30 and 15 of the form of my invention shown in Fig. 1.

An elongated recess 77 is provided along the edge of the depending portion 67 opposite the upper portion 66, and is adapted to receive a spring 78, one end of which abuts against an end 79 of said recess 77 and the opposite end against a bridge 80 located in the U-shaped member 61 constructed in the same manner as bridge 21 of the embodiment of my invention described above. Recess 77 extends from its rear end 79 throughout the remainder of the length of the member 65. A notch 81, as shown more clearly in Fig. 9, is provided in the winner wall 77' of the recess 77.

A locking mechanism, designated generally by the numeral 82, is pivotally supported intermediate the walls 62 on a pin 83 which is mounted in the side walls 62, as is shown more clearly in Figs. 8 and 9. The locking mechanism 82, shown in detail in Fig. 12, is provided with a pawl 84 adapted to swing into recess 81 and abut thereagainst for locking the hook shut, as best shown in Fig. 8. A spring 85 constantly urges the pawl 84 toward the recess 81.

A push button operating member 86 is pivotally connected to the member 82 by means of a pin 87 inserted through an elongated slot 88 provided in the end 89 of the locking member 82 opposite the pawl 84. A pair of elongated slots 90 provided in the walls 62 slidably receive the pin 87 and permit sliding motion of said pin therein. Upstanding fingers 91 formed on one end of the push button 86 embrace the end 89 and are provided with aligned holes 92 for reception of the pin 87.

The operation of this form of my invention is very similar to that of the form described above, with the exception of the operation of the locking mechanism. In order to open the snap and cause the C-hook 69 to open for the reception of a ring or the like 51, the push button 86 is pressed inwardly. This movement causes the pawl 84 to be withdrawn from the notch 81. This action will permit relative sliding of the members 61 and 65; and, as will be seen, as long as the hook stays open, the pawl 84 will slide along the inside wall 77'.

When the pressure on the serrations 64 and 76 is released, the spring 78, acting against the end 79 of the recess 77 and the bridge 80, causes the members 61 and 65 to slide in relation to each other, thus causing the hooks 69 to close over the notch 69', as shown in Fig. 8. At the same time the pawl 84 moves into position where it can engage in the recess 81, thus positively locking the hook against coming open until the push button 86 is again pressed inwardly and the pawl 84 is swung out of the notch 81.

It is hereby understood that deviations in material, type of spring and location of the locking and limiting members may be resorted to without deviating from the spirit of my invention.

I claim:

1. A sliding snap hook comprising an elongated body member substantially U-shaped in cross section throughout a substantial portion of the length thereof, said U-shaped body member having spaced side walls with a connecting wall therebetween along one edge of said member and having the opposite edge thereof open along a substantial portion of its length, an inner member slidably mounted in the U-shaped body member lengthwise thereof, said inner member having an elongated edge portion projecting from the open edge portion of the body member in a position to permit grasping of said projecting edge portion and the connecting wall between thumb and forefinger of one hand for relative lengthwise displacement of the members, said inner member having a laterally opening hook on one end thereof externally of the adjacent ends of the side walls of the outer member, and a projection on the adjacent end of the connecting wall of the outer member overlapping the end of the hook and for closing the hook, said projection having opposite side wall portions along opposite edges thereof embracing the hook at both opposite sides.

2. A sliding snap hook comprising an elongated body member substantially U-shaped in cross section throughout a substantial portion of the length thereof, said U-shaped body member having spaced side walls with a connecting wall therebetween along one edge of said member and having the opposite edge thereof open along a substantial portion of its length, an inner member slidably mounted in the U-shaped body member lengthwise thereof, means for guiding said members for relative straight-line motion with respect to each other including a pin on one of the members, the other member having a straight elongated slot therein receiving the pin and of a width throughout its length substantially equal the diameter of the pin, said inner member having an elongated edge portion projecting from the open edge portion of the body member in a position to permit grasping of said projecting edge portion and the connecting wall between thumb and forefinger of one hand for relative lengthwise displacement of the members, said inner member having a laterally opening hook on one end thereof externally of the adjacent ends of the side walls of the outer member, and a projection on the adjacent end of the connecting wall of the outer member overlapping the end of the hook and for closing the hook, said projection having opposite side wall portions along opposite edges thereof embracing the hook at both opposite sides.

3. A sliding snap hook comprising an elongated body member substantially U-shaped in cross section throughout a substantial portion of the length thereof, said U-shaped body member having spaced side walls with a connecting wall therebetween along one edge of said member and having the opposite edge thereof open along a substantial portion of its length, an inner member slidably mounted in the U-shaped body member lengthwise thereof, said inner member having an elongated edge portion projecting from the open edge portion of the body member in a position to permit grasping of said projecting edge portion and the connecting wall between thumb and forefinger of one hand for relative lengthwise displacement of the members, said inner member having a laterally opening hook on one end thereof externally of the adjacent ends of the side walls of the outer member, a projection on the adjacent end of the connecting wall of the outer member overlapping the end of the hook and for closing the hook, said projection having opposite side wall portions along opposite edges thereof embracing the hook at both opposite sides, and a coiled spring interposed between the members normally tending to hold the projection closed over the hook.

4. A sliding snap hook comprising an elongated body member substantially U-shaped in cross section throughout a substantial portion of the length thereof, said U-shaped body member having spaced side walls with a connecting wall therebetween along one edge of said member and having the opposite edge thereof open along a substantial portion of its length, an inner member slidably mounted in the U-shaped body member lengthwise thereof, said inner member having an elongated edge portion projecting from the open edge portion of the body member in a position to permit grasping of said projecting edge portion and the connecting wall between thumb and forefinger of one hand for relative lengthwise displacement of the members, said inner member having a laterally opening hook on one end thereof externally of the adjacent ends of the side walls of the outer member, a projection on the adjacent end of the connecting wall of the outer member overlapping the end of the hook and for closing the hook, said projection having opposite side wall portions along opposite edges thereof embracing the hook at both opposite sides, and means for locking the members together against relative sliding movement in one direction.

5. A sliding snap hook comprising an elongated body member substantially U-shaped in cross section throughout a substantial portion of the length thereof, said U-shaped body member having spaced side walls with a connecting wall therebetween along one edge of said member and having the opposite edge thereof open along a substantial portion of its length, an inner member slidably mounted in the U-shaped body member lengthwise thereof, said inner member having an elongated edge portion projecting from the open edge portion of the body member in a position to permit grasping of said projecting edge portion and the connecting wall between thumb and forefinger of one hand for relative lengthwise displacement of the members, said inner member having a laterally opening hook on one end thereof externally of the adjacent ends of the side walls of the outer member, a projection on the adjacent end of the connecting wall of the outer member overlapping the end of the hook and for closing the hook, said projection having opposite side wall portions along opposite edges thereof embracing the hook at both opposite sides, and means for locking the members together against relative sliding movement in one direction, said locking means comprising a rotatable member carried by the body member, said inner member having an elongated keyhole slot therein receiving said rotatable member for locking said members together when turned in one position.

6. A sliding snap hook comprising an elongated outer member having a pair of upstanding side walls and an interconnecting wall joining said side walls together at adjacent edges of the side walls, a bridge carried within said walls intermediate the ends thereof, an elongated inner member slidably mounted within said outer member, a hook device carried on one of said members at an end thereof and cooperating with the other member to close the hook device, said inner member having an elongated recess along a side thereof slidably receiving the bridge, resilient means interposed between the bridge and an end of the recess normally tending to move the inner and outer members relative to each other, and means for locking the members together against relative sliding movement in one direction, said locking means comprising a rotatable member carried by the outer member oblong in cross section, said inner member having an elongated key-hole slot therein receiving said rotatable member for locking said members together when turned to one position.

7. A sliding snap hook comprising an elongated outer member having a pair of upstanding side walls and an interconnecting wall joining said side walls together at adjacent edges of the side walls, a bridge carried within said walls intermediate the ends thereof, an elongated inner member slidably mounted within said outer member and having flat sides embraced throughout the major portion of said inner member by the side walls of the outer member and throughout a substantial portion of the length of said members and with an edge portion of the inner member projecting from the outer member at an edge opposite said connecting wall, a hook device carried on one of said members at an end thereof and cooperating with the other member to close the hook device, said inner member having an elongated recess along a side thereof slidably receiving the bridge, resilient means interposed between the bridge and an end of the recess normally tending to move the inner and outer members relative to each other, means for locking the members together against relative sliding movement in one direction, said locking means comprising a rotatable member carried by the outer member oblong in cross section, said inner member having an elongated key-hole slot therein receiving said rotatable member for locking said members together when turned to one position and said inner member having a pair of spaced elongated and longitudinally extending slots formed therein, a pin for each of said slots, said pins being mounted on said side walls, said pins and said slots cooperating to form means for limiting the relative sliding movement between said members.

References Cited in the file of this patent
UNITED STATES PATENTS

| Number | Name | Date |
|---|---|---|
| 172,319 | Hubbard | Jan. 18, 1876 |
| 295,683 | Shaw | Mar. 25, 1884 |
| 327,008 | Miller | Sept. 29, 1885 |
| 517,729 | Cable | Apr. 3, 1894 |
| 652,556 | Gavitt | June 26, 1900 |
| 741,014 | Covert | Oct. 13, 1903 |
| 828,823 | Maize | Aug. 14, 1906 |
| 1,158,900 | Depollier | Nov. 2, 1915 |
| 1,201,175 | Grunwald | Oct. 10, 1916 |
| 1,240,662 | Brislawn | Sept. 18, 1917 |
| 1,322,458 | Lyon et al. | Nov. 18, 1919 |
| 1,334,830 | Bastord | Mar. 23, 1920 |
| 1,585,314 | Pericle | May 18, 1926 |
| 1,644,562 | Browning | Oct. 4, 1927 |
| 1,874,632 | Sanon | Aug. 30, 1932 |
| 2,124,276 | Steigenberger | July 19, 1938 |

FOREIGN PATENTS

| Number | Country | Date |
|---|---|---|
| 4,712 | Great Britain | 1915 |
| 18,142 | Great Britain | 1893 |
| 42,287 | Switzerland | 1908 |
| 134,699 | Switzerland | Oct. 16, 1929 |